(12) United States Patent
Azuma et al.

(10) Patent No.: US 6,926,671 B2
(45) Date of Patent: Aug. 9, 2005

(54) ULTRASONIC IMAGING APPARATUS AND METHOD

(75) Inventors: Takashi Azuma, Kodaira (JP); Shin-ichiro Umemura, Hachioji (JP); Yuichi Miwa, Tokyo (JP)

(73) Assignee: Hitachi Medical Corporation, Tokyo (JP)

( * ) Notice: Subject to any disclaimer, the term of this patent is extended or adjusted under 35 U.S.C. 154(b) by 123 days.

(21) Appl. No.: 10/314,263

(22) Filed: Dec. 9, 2002

(65) Prior Publication Data

US 2003/0149362 A1 Aug. 7, 2003

(30) Foreign Application Priority Data

Feb. 5, 2002 (JP) ........................................ 2002-028555

(51) Int. Cl.[7] .................................................. A61B 8/02
(52) U.S. Cl. ........................ 600/459; 600/437; 600/446; 600/462; 600/466; 73/625; 73/626; 367/11; 367/103; 367/104; 367/105
(58) Field of Search .............................. 600/437–472; 73/625, 626; 367/11, 103, 104, 105

(56) References Cited

U.S. PATENT DOCUMENTS

| | | | | |
|---|---|---|---|---|
| 5,938,611 A | * | 8/1999 | Muzilla et al. | 600/455 |
| 6,213,947 B1 | * | 4/2001 | Phillips | 600/443 |
| 6,241,674 B1 | * | 6/2001 | Phillips et al. | 600/443 |
| 6,599,248 B1 | * | 7/2003 | Tamura | 600/454 |

FOREIGN PATENT DOCUMENTS

| | | |
|---|---|---|
| JP | 11-309145 | 11/1999 |
| JP | 11-309146 | 11/1999 |
| JP | 11-309147 | 11/1999 |

OTHER PUBLICATIONS

Robinson et al., "The Error in Least–Squares Filtering, Geophysical Signal Analysis", 1980, pp. 191–212.

Laurence R. Welch et al, "Practical Spread Spectrum Pulse Compression for Ultrasonic Tissue Imaging", IEEE Transactions on Ultrasonics, Ferroelectrics, and Frequency Control, vol. 45, No. 2, Mar. 1998, pp. 349–355.

Haider, B., "Pulse Elongation and Deconvolution Filtering for Medical Ultrasonic Imaging", IEEE Transactions on Ultrasonics, Ferroelectrics, and Frequency Control, vol. 45, No. 1, Jan. 1998, pp. 98–113.

* cited by examiner

Primary Examiner—Brian L. Casler
Assistant Examiner—William Jung
(74) Attorney, Agent, or Firm—Mattingly, Stanger, Malur & Brundidge, P.C.

(57) ABSTRACT

An ultrasonic imaging apparatus and method combines dynamically focused reception and coded transmission/reception technologies by inexpensive circuitry. A receive aperture is divided into smaller apertures. Correspondingly, a receive beam former is divided into receive sub-beam formers 36a to 36n by which a phase alignment and summing process is performed. Thereafter, coded signals are compressed in decoders 37a to 37n in a time axis direction. Output signals from the decoders are once again subjected to a phase alignment and summing process in a second beam former.

9 Claims, 12 Drawing Sheets

ULTRASONIC IMAGING APPARATUS AND METHOD

BACKGROUND OF THE INVENTION

1. Technical Field

The present invention relates to ultrasonic imaging apparatus and methods for imaging internal organs of a sample body using ultrasound.

2. Background Art

Ultrasonic imaging apparatus, such as those used for medical diagnostical imaging, utilize ultrasonic pulse reflection to display a tomographic image of soft tissues of a living body or an image of blood flowing in a living body for observation on a monitor practically in real time. Ultrasonic imaging apparatus are considered highly safe, because they do not expose the subject to radiation as diagnostical imaging apparatus employing radiation. In addition, they are small and inexpensive. For these reasons, ultrasonic imaging apparatus are widely used in the field of medicine.

An ultrasonic imaging apparatus produces images in the following way. An ultrasonic wave is transmitted to a subject from an ultrasonic probe made up of an array of piezoelectric elements. The position where the ultrasonic waves are focused inside the subject is controlled by adjusting the timing at which the ultrasonic waves are transmitted by each of the elements in the array. A region to be imaged is entirely scanned by the ultrasonic waves in this manner to produce a tomographic image. If the real-time nature of imaging can be disregarded, it is only necessary to bring both transmission wave and reception wave into focus at each point in the imaged region. However, in reality, in order to realize both a good image quality and the real-time feature, the ultrasound is generally focused at each point only during reception and not necessarily during transmission.

Specifically, during transmission, the ultrasonic waves are focused only at representative points along the line of propagation of the sound. On the other hand, during reception, the positions inside the subject at which the signal was reflected are estimated based on the timing of reception. The reception signals of the individual elements in the array are summed while introducing a predetermined delay such that the ultrasonic wave is focused at the position from where the reception signal was reflected. By varying the delay time, the reception focal point is varied. This system wherein the ultrasonic wave is received while the delay time is varied continuously is called the dynamic focus system. Once the information on one scan line is obtained, an adjacent scan line is scanned while the dynamic focusing operation is performed, and this is repeated to produce a two-dimensional tomographic image.

A description of the waveform of an ultrasonic wave transmitted to a living body by an ultrasonic imaging apparatus will follow. As for the ultrasonic waveform transmitted to the living body from a probe of the ultrasonic imaging apparatus, since the length of the waveform determines the distance resolution, a pulse wave with as short a length as possible along the time axis should preferably be used. On the other hand, the signal intensity should be large if the SN (signal to noise) ratio, which is the intensity ratio of signal to noise, is to be improved. However, the maximum value of the ultrasonic wave intensity should be limited by taking its influence on the living body into account. In order to increase the transmission energy under such a limitation, a coded transmission/reception method commonly used in radar applications is employed. In this method, a coded signal elongated along the time axis is transmitted. A reflection signal from the inside of the subject is received and converted into an electric signal. The electric signal is compressed along the time axis by filtering, so that the signal is transformed back to a pulse wave.

The coded transmission/reception method will be described by referring to FIG. 1. FIG. 1A shows the case where the transmission waveform is not coded, while FIG. 1B shows the case where the waveform is coded.

As shown in FIG. 1A, when the transmission waveform is not coded, as an ultrasonic probe 11 is energized by a drive pulse a1, an ultrasonic pulse with a form b1 is generated by the transfer function of the ultrasonic probe 11 in a process of transforming the electric pulse into an ultrasonic signal. The ultrasonic pulse is transmitted into the living body and reflected by a reflector 15 inside the body. The reflected pulse is received by the ultrasonic probe 11 and converted into an electric signal. The electric signal is converted into a digital signal by an A/D converter 12. Here the reception signal is again transformed by a transfer function, so that it comes to have a waveform c1 whose amplitude is the signal intensity. In ultrasonic tomographic imaging, the distance to the reflector 15 is determined by the time it takes for the pulse to return. Accordingly, the distance resolution is about equal to the width of the pulse waveform c1, which in the illustrated example is about three times the wavelength.

On the other hand, in the case of the coded transmission/reception method, a drive coded pulse a2 elongated along the time axis is used, as shown in FIG. 1B. As the ultrasonic probe 11 is driven with this drive coded pulse a2, an ultrasonic signal with a waveform b2 is transmitted into the living body from the ultrasonic probe 11 and reflected by the reflector 15. The reflected signal is again converted into an electric signal by the ultrasonic probe 11, thereby producing a receive waveform c2. By using a decoding filter 13 corresponding to the drive coded pulse a2, the waveform c2 is compressed along the time axis by the amount by which the drive signal has been elongated. As a result, a demodulated waveform d2 is obtained which has a similar level of distance resolution and a larger signal intensity compared with the receive waveform c1. Thus, transmission energy can be increased without increasing the amplitude inside the living body. Namely, according to the coded transmission/reception method, the reflected ultrasonic wave, after passing through the subject, is converted into an electric signal by the ultrasonic probe and compressed along the time axis while maintaining its signal energy, so that the reception signal is converted into a pulse signal having a large peak value.

This technique is combined e.g. with the known Barker code or Golay code, and a mismatched filter for minimizing the side lobe as described in Robinson et al., "Geophysical Signal Analysis," Prentice-Hall (1980), pp. 191–212. Specifically, the use of a code such as the Barker code having small sidelobes in its auto-correlation function, as the transmit code, enables the receive signal to be easily converted back to a pulse signal. A decoding filter producing auto-correlation function as the output can be an excellent filter because of its excellent capability to extract a signal out of noise. However, when a Barker coded signal is decoded by itself, there are still, though small, sidelobes of a minimum of about −20 dB, which is within the dynamic range of the image. Thus, a decoding filter producing the auto-correlation function is not good enough as a decoding filter in this case. The mismatched filter is a modification of the decoding filter in which the sum of squared errors with respect to a simple delta function having no sidelobes is minimized. Examples of the application of this method to ultrasonic imaging apparatuses are disclosed in IEEE Transaction on Ultrasonics, Ferroelectrics, and Frequency Control, Vol. 45, No. 2, pp. 349–355 (1998), and Vol. 45, No. 1, pp. 98–113 (1998); and JP Patent Publication (Nonexamined Application) Nos. 11-309145, 11-309146, and 11-309147, for example.

It is difficult to combine the above-described dynamic focusing technique and coded transmission/reception technique, as illustrated in FIG. 2. For simplicity's sake, two reflectors, 21a and 21b, are considered. Echo signals from each of the reflectors 21a, 21b are each distributed within a circle with the position of each reflector at the center of each circle, as shown. Reception timings at the ultrasonic probe vary by an amount corresponding to the difference in the positions of the reflectors. If the coded transmit wave is longer than the distance between the reflectors 21a and 21b, the echo signals are superposed on the other in reception. If the individual elements on the ultrasonic probe share the same degree of superposition, the coded signal can be restored by passing the superposed signals through a decoding filter after beamforming.

In the case of dynamic focusing, however, because delay time 22a and 22b after the reception phase alignment and summing vary continuously depending on the reception timing, that is the estimated position of the reflector. As a result, the degree of superposition of the echo signals from the two points varies depending on the position of each element on the ultrasonic probe. If the phase alignment and summing process is conducted for all the elements uniformly and the elements are bundled, the effect of coding will not be uniform between the individual apertures and, as a result, it becomes impossible to decode the signals. Here, the aperture is the span of the portion of the all elements making up the ultrasonic probe which is actually used. More specifically, a transmit aperture is the area in which those elements of the ultrasonic probe that are used for transmitting ultrasonic waves are arranged. A receive aperture is the area in which elements for receiving ultrasonic waves for subsequent processes are arranged. Although there is a method of decoding the codes before the phase alignment and summing process, this method requires a large-sized circuitry, which means losing one merit of the ultrasonic imaging apparatus—its inexpensiveness. Particularly, in the case of three-dimensional imaging using a two-dimensional array probe, the number of elements ranges from one to several thousands. Thus, it is virtually impossible to attach a decoder to each element.

It is, therefore, an object of the invention to combine the coded transmission/reception and dynamic focusing techniques without requiring large-sized circuitry or giving rise to unwanted responses that are typically associated with the coded transmission/reception technology.

SUMMARY OF THE INVENTION

The ultrasonic imaging apparatus according to the present invention comprises an ultrasonic probe having a plurality of oscillators and an aperture for transmitting and receiving an ultrasonic wave; a transmit signal processing circuit for producing a coded signal extended along the time axis, the coded signal driving the ultrasonic probe; a receive sub-aperture selection switch for dividing receive signals from the individual oscillators of the ultrasonic probe into a plurality of groups; a plurality of receive beam formers for phase-aligning and summing a plurality of receive signals outputted from a plurality of oscillators belonging to each of the groups; and a decoding receive beam former for compressing a plurality of receive coded sequence signal waveforms outputted from the plurality of receive beam formers along the time axis, and summing the compressed signals while controlling the delay time.

The decoding receive beam former may comprise a plurality of decoding filters individually connected to the plurality of receive beam formers, and a beam former between sub-apertures for phase-aligning and summing while controlling the distribution of the delay time in the output of the plurality of decoding filters.

The grouping by the receive sub-aperture selection switch can be carried out such that the lengths of the focal ranges of the ultrasonic wave by the plurality of receive formers are substantially identical. The length of focal range refers to the −6 dB width of a sound pressure distribution along the axis of beam propagation. By the lengths of the focal ranges being substantially identical it is meant that the difference between the length of a longer focal range and that of a shorter focal range is roughly in a range of ±30% of the length of the longer focal range. Although a smaller difference obviously means a greater effect of increasing the focal range relative to the number of divided apertures. However, since the number of elements in the entire group of apertures is limited, it is impossible to completely unify the focal ranges in each and every receive sub-aperture. Nevertheless, desired effects can still be obtained.

The receive sub-aperture selection switch may comprise a plurality of switches to which of the plurality of receive beam formers each oscillator of the ultrasonic probe is to be connected, and a control means for controlling the switches.

The oscillators of the ultrasonic probe may be two-dimensionally disposed, and the receive sub-aperture selection switch may be operated to divide the reception signals from the individual oscillators into a plurality of groups such that the difference in the delay time in the individual receive beam formers is minimized.

The plurality of oscillators of the ultrasonic probe may be two-dimensionally arranged, and the receive sub-aperture selection switch may be operated to divide the reception signals from the individual oscillators into a plurality of groups such that oscillators spatially positioned adjacent one another in the ultrasonic probe belong to the same group.

The ultrasonic imaging apparatus may further comprise a transmit waveform storage means for storing a plurality of code sequences, and a selection means for selecting one code sequence from the plurality of codes sequences stored in the transmit waveform storage means, wherein the decoder may operate to change the decoding filter coefficient in accordance with the code sequence selected by the selection means. By selecting a code which is extended along the time axis, the S/N ratio can be improved. However, if the transmit waveform is longer than the focal range of dynamic focusing, decoding cannot be performed after dynamic focusing. Thus, the number of groups to be produced by division by the receive sub-aperture selection switch should be increased.

The receive sub-aperture selection switch may divide the receive signals from the individual oscillators into a plurality of groups such that the closer a particular group is to the foot of a line extending from a transmit focus position normal to the surface of the ultrasonic probe, the greater the number of the oscillators that belong to the group.

An ultrasonic imaging method according to the present invention comprises the steps of: transmitting an ultrasonic beam coded by a code sequence from an ultrasonic probe having a plurality of oscillators and an aperture for transmitting and receiving ultrasonic waves; dividing the plurality of oscillators of the ultrasonic probe into a plurality of groups; generating a plurality of beamformed signals by phase-aligning and summing a plurality of receive signals outputted by a plurality of oscillators belonging to each group; compressing the plurality of beamformed signals along a time axis; and summing the compressed signals while controlling the delay time between the signals.

In this ultrasonic imaging method, the plurality of oscillators of the ultrasonic probe may be grouped such that the difference in delay time during the beamforming is minimized.

DETAILED DESCRIPTION OF PREFERRED EMBODIMENTS

The invention will be hereafter described by way of embodiments with reference made to the attached drawings, in which elements or parts having similar functions are referenced by similar numerals.

Figure 1A:
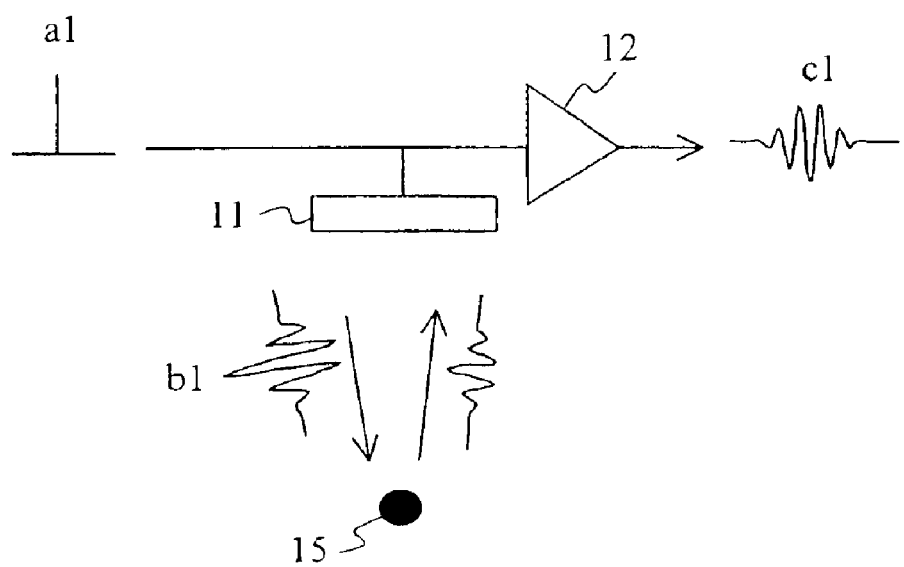
FIGS. 1A and 1B illustrate transmission/reception without and with coded transmission method.
Figure 1B:
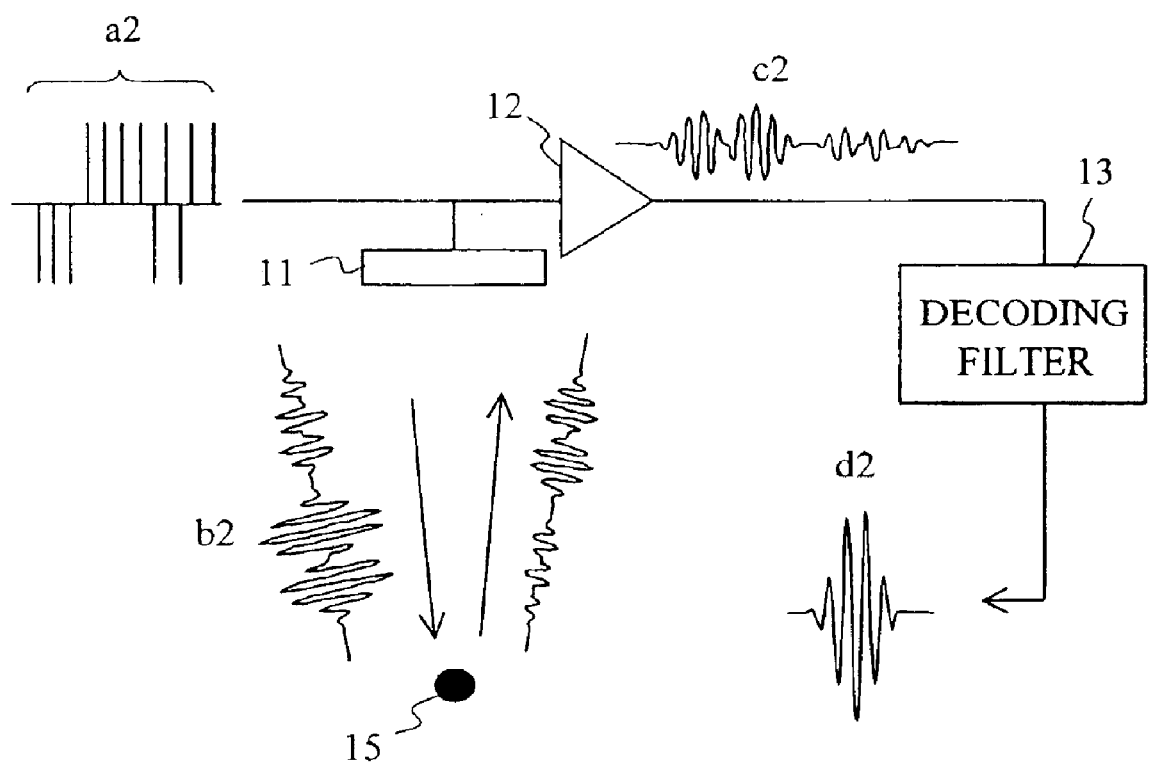
Figure 2:
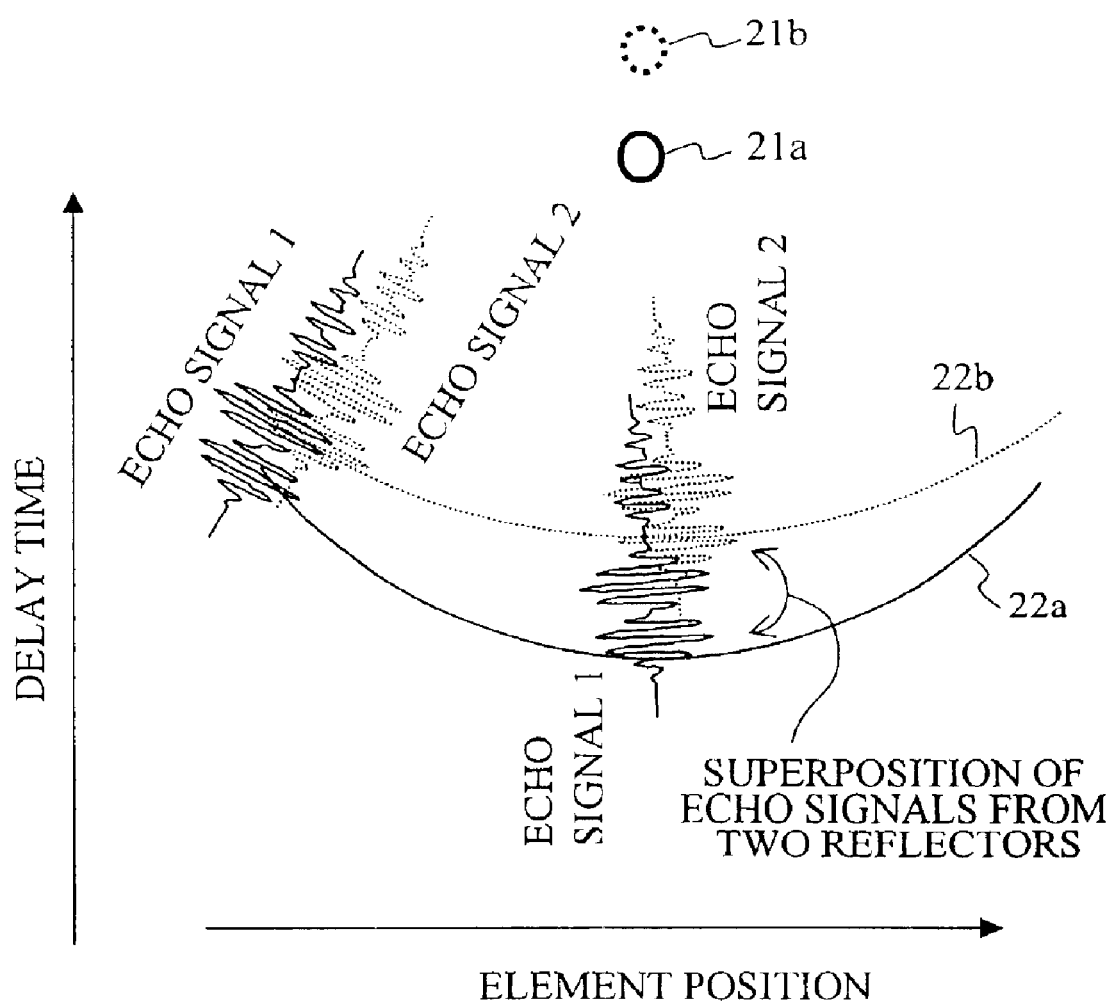
FIG. 2 is a drawing illustrating the difficulty of combining the dynamic focusing technique and the coded transmission/reception method.
Figure 3:
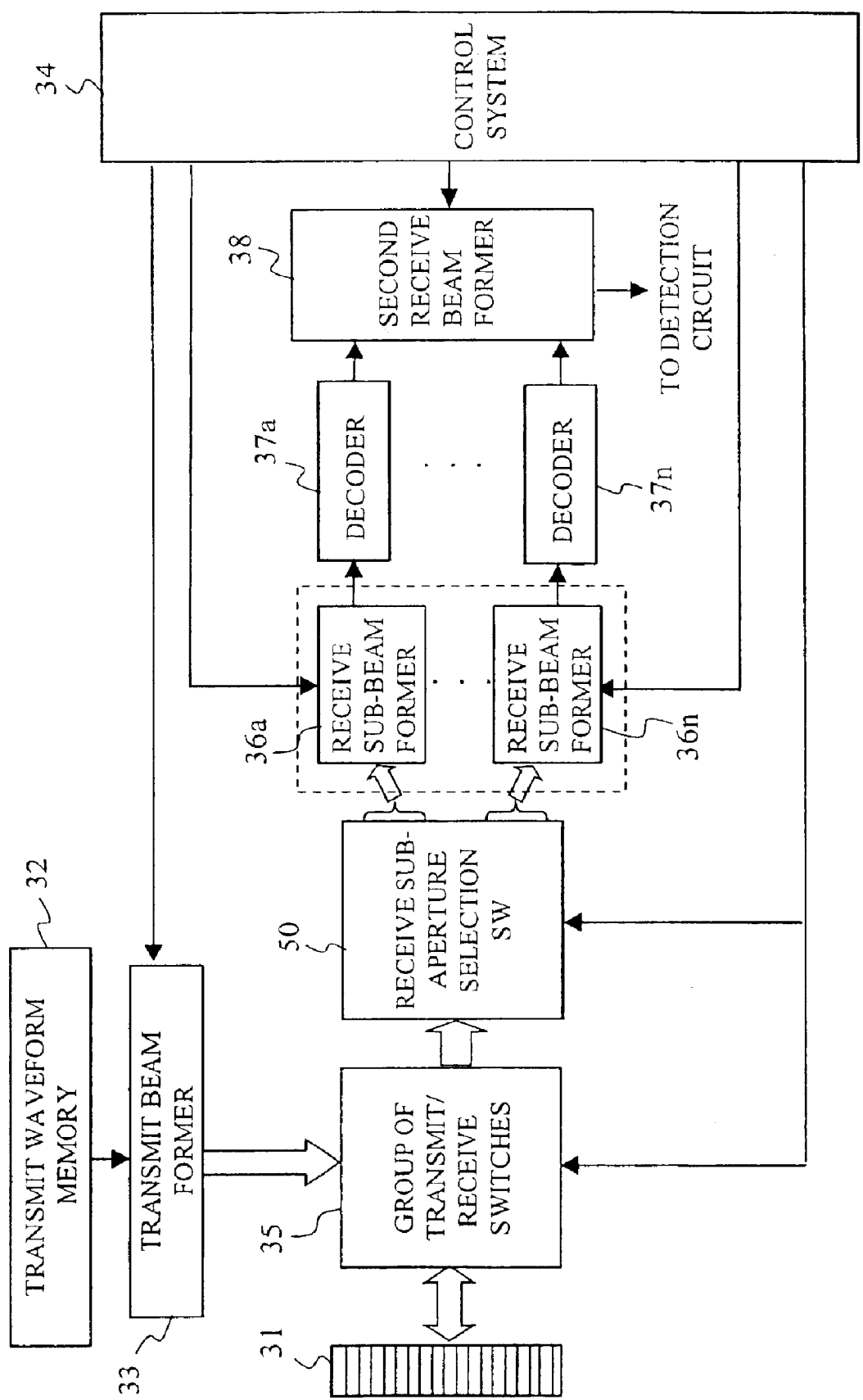
FIG. 3 shows a block diagram of an example of the ultrasonic imaging apparatus according to the present invention.

FIG. 3 shows a block diagram of an example of the ultrasonic imaging apparatus according to the invention. An ultrasonic probe 31 transmits a beam of ultrasonic waves to a subject (not shown) and receives an echo signal. A transmit signal (coded pulse signal) is read from a transmit waveform memory 32 and sent by the transmit beam former 33 via a group of transmission/reception switches 35 to the ultrasonic probe 31 under the control of a control system 34, with a delay time adapted to the transmit focusing point corresponding to the signal. The ultrasonic signal reflected or scattered inside the subject is returned to the ultrasonic probe 31. The ultrasonic probe 31 converts the ultrasonic signal into an electric signal. The electric signal is divided into receive sub-beam formers 36a to 36n by a receive sub-aperture selection switch 50 via the group of transmission/reception switches 35. In each receive sub-beam former for beamforming, a delay time is set to the receive signals for each element in the ultrasonic probe. The delay time is adjusted by dynamic focusing under the control of the control system 34 according to the reception timing. After beamforming in the individual receive sub-beam formers 36a to 36n, the coded signals are compressed in the decoders 37a to 37n along the time axis. The signals from the decoders 37a to 37n are beamformed in the second receive beam former 38 and sent to a detection circuit. Thereafter, the output of the detection circuit is filtered in a conventional manner (not shown) and displayed as an image via a scan converter.

Figure 4:
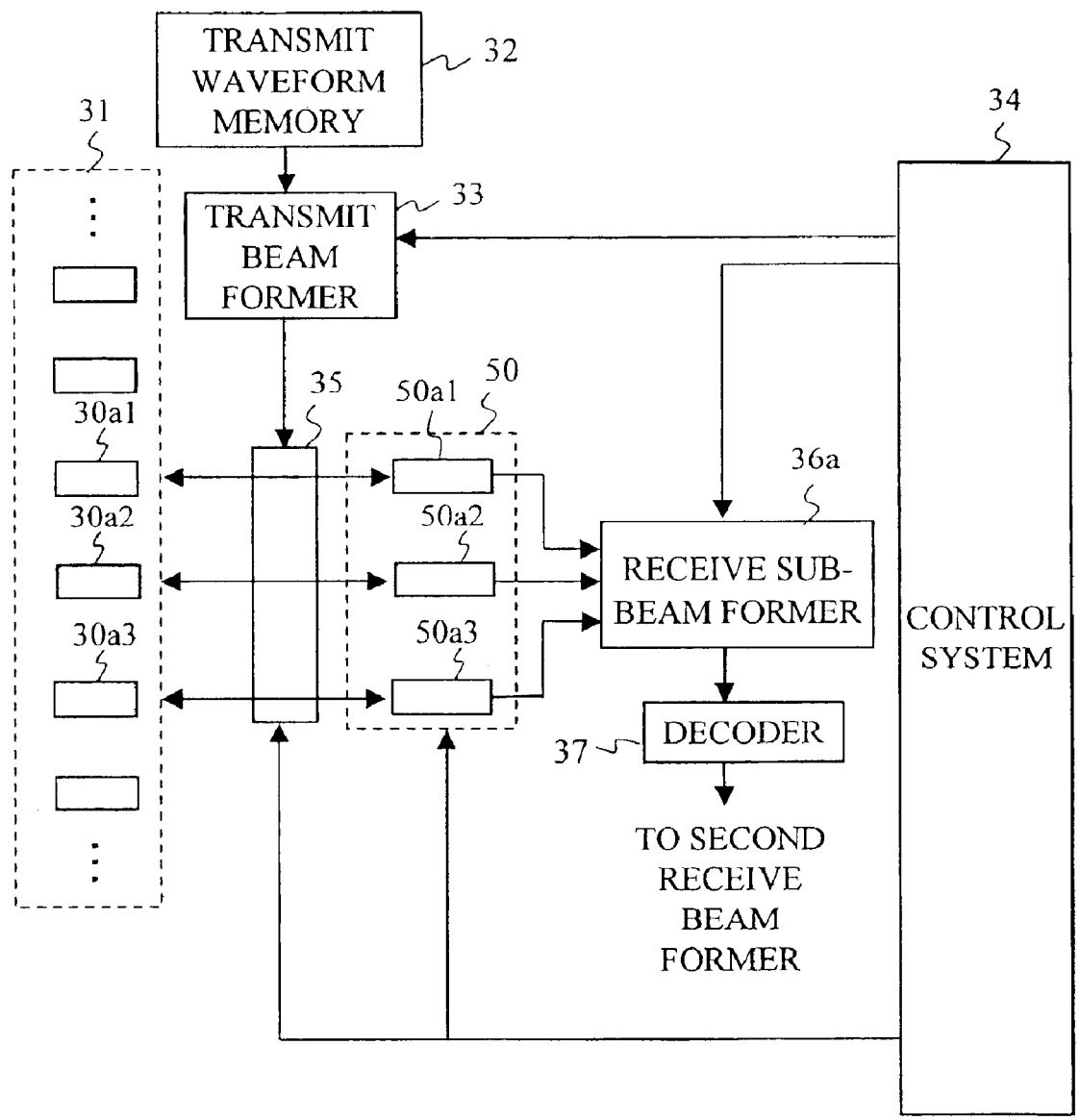
FIG. 4 shows a block diagram of a circuit portion surrounding a single receive sub-beam former.

FIG. 4 shows a part of FIG. 3 surrounding a single receive sub-beam former 36a. Of the receive signals from the plurality of oscillators forming the ultrasonic probe 31, only those signals that entered the oscillators 30a1 to 30a3 are input to the receive sub-beam former 36a via the group of transmission/reception change-over switch 35a and the receive sub-aperture selection switch 50 (50a1 to 50a3). To which receive sub-beam former each oscillator in the ultrasonic probe 31 is connected at each timing is uniquely determined by the control system 34.

Figure 5:
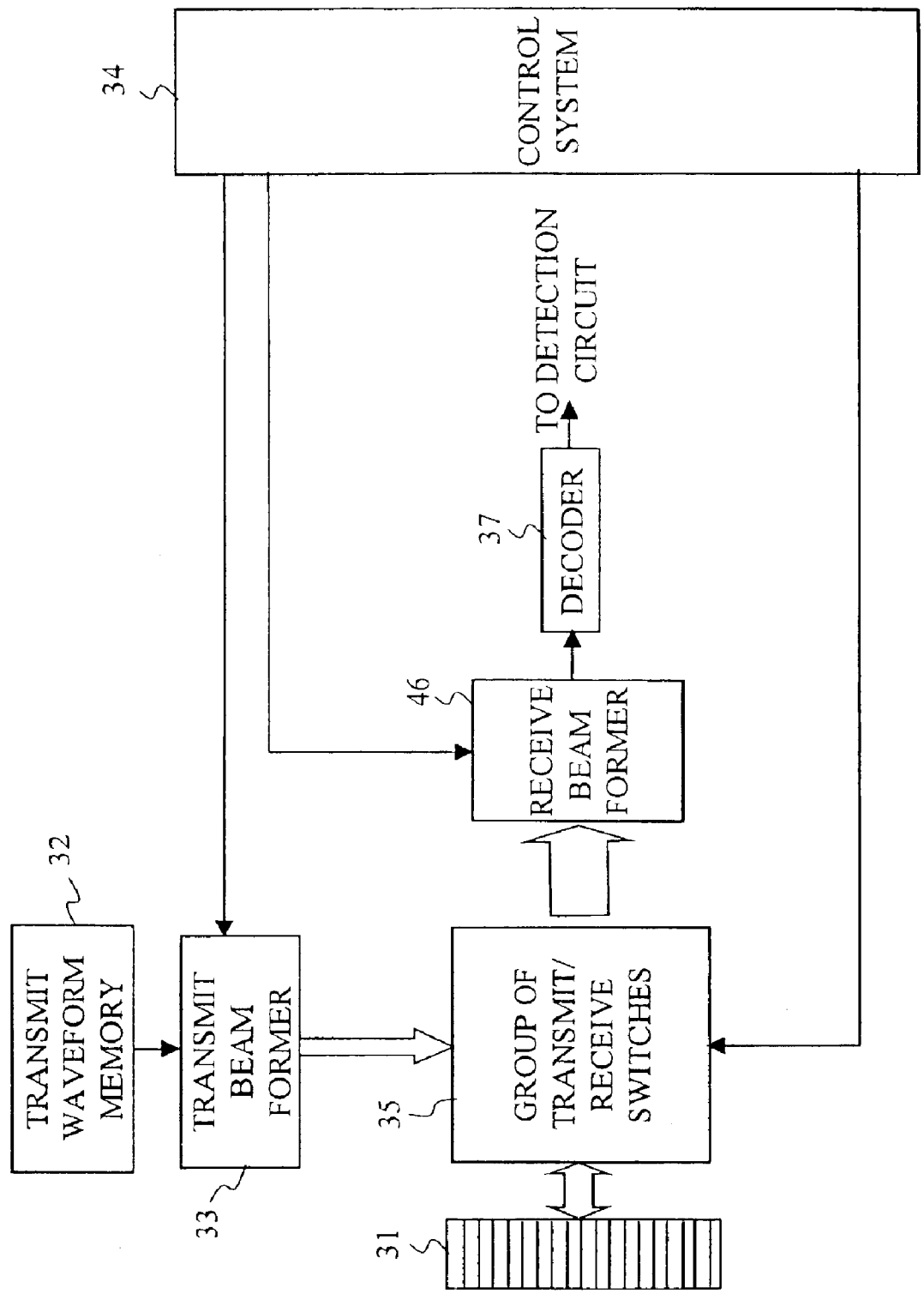
FIG. 5 shows a block diagram of an example of the coded transmission/reception system according to the prior art.

FIG. 5 shows a diagram of a coded transmission/reception system according to the prior art, for comparison purposes. In this conventional system, the reception signals of the entire channels that have passed through the group of transmission/reception switches 35 are beamformed in a single receive beam former 46, thereby producing a single-channel signal. The signal is sent to the detection circuit after the coded signals are compressed along the time axis in a single decoder 37.

Figure 6:
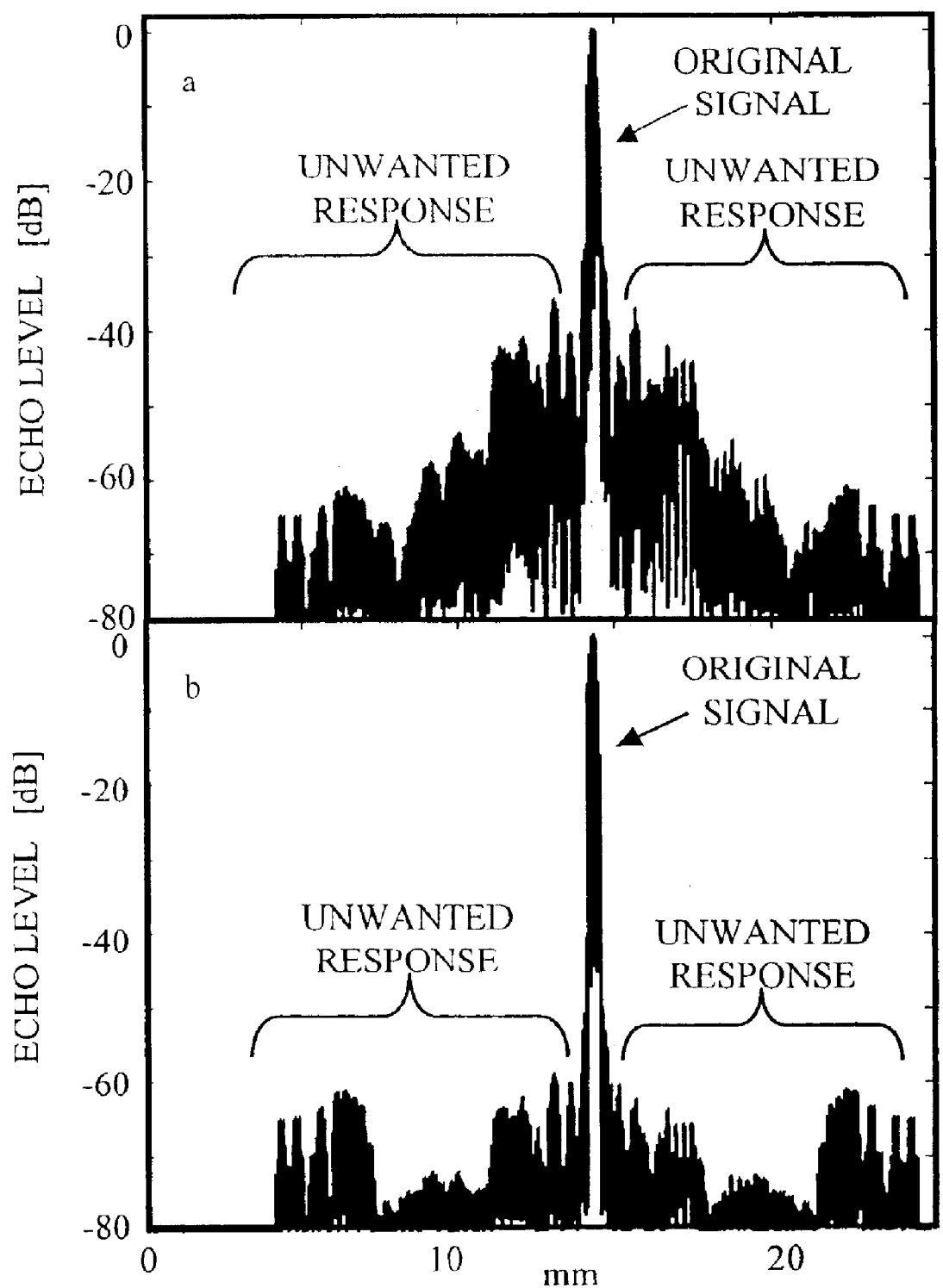
FIG. 6 shows the results of simulation comparing different code lengths of decoded waveforms.

When the conventional system shown in FIG. 5 is used, if the coded signal leaves the receive focal range, unwanted responses occur when the coded signal is compressed along the time axis. FIG. 6 shows simulation results. The central peak corresponds to the signal after compression along the time axis, and the signals on either side of the central peak are unwanted responses. FIG. 6(a) shows the case where the length of the coded signal extends outside the focal range, while FIG. 6(b) shows the case where it does not. Since the dynamic range of an ultrasonic image is normally about 60 dB, it can be seen that the unwanted responses in FIG. 6(a) is large enough to pose a problem in diagnosis.

One method of reducing these unwanted responses is to provide a decoder 37 between the group of transmission/reception switches 35 and the receive beam former 46 for each channel. The size of the decoder varies depending on the length and type of the code used. Generally, however, the necessary size of the decoder increases as the code length becomes longer or the more the unwanted responses are to be suppressed. For example, when the above-mentioned mismatched filter is used as the decoder and a Barker code with a code length 13 is used as the transmit signal, the decoder must be provided with 67 taps if the unwanted responses are to be suppressed below −60 dB. Thus, if the decoder is to be provided for each element, the circuit size would become too large.

This problem can be solved by the method of the invention, whereby the receive beam former is divided into a plurality of sub-beam formers and, after decoding, the output signals of the individual decoders are phase-aligned and summed with the second beam former.

Figure 7:
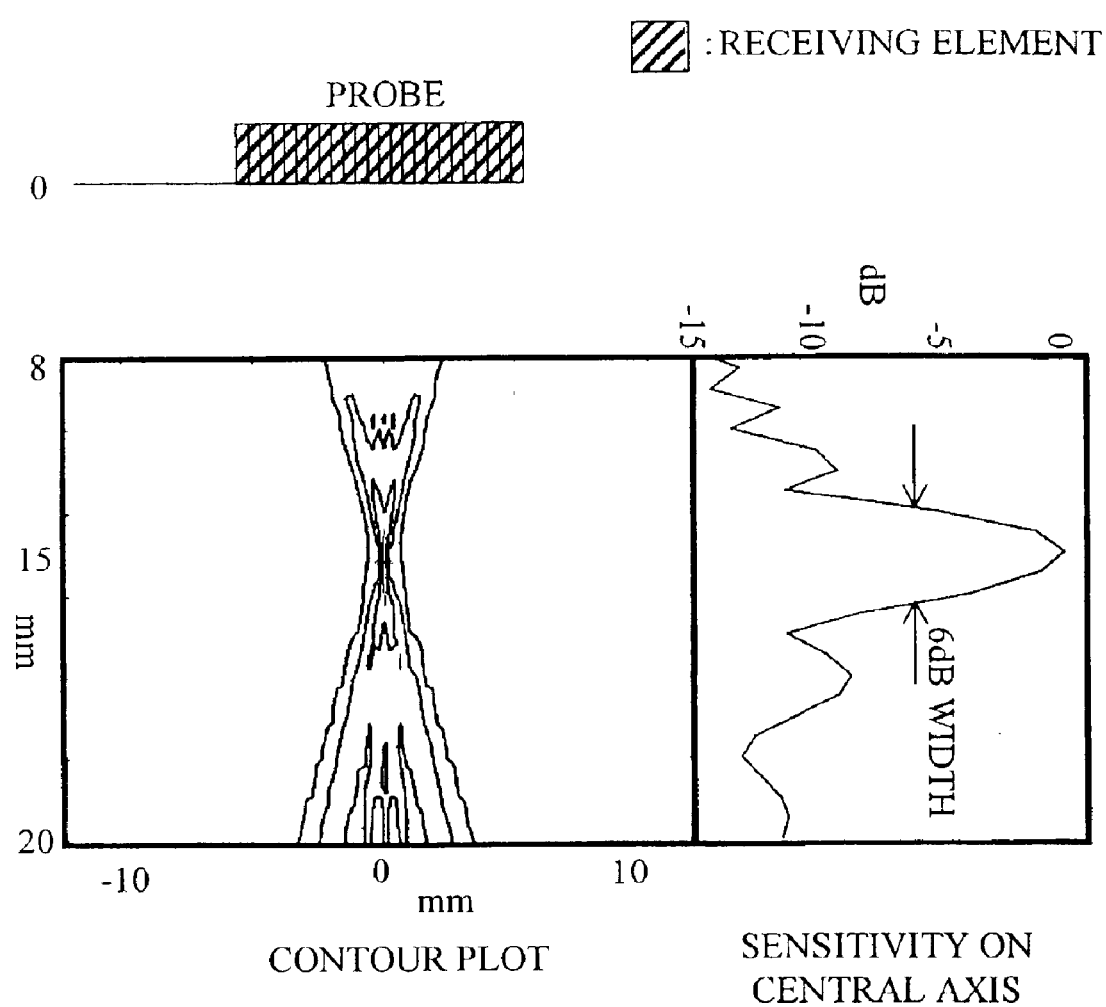
FIG. 7 shows the results of a simulation of illustrating the sensitivity distribution in the case of reception using all of the apertures.

How much the focusing range can be expanded by the present invention will be described by referring to the results of simulations. FIG. 7 shows the sensitivity distribution in the case where the signals from all the elements were beamformed at once when F-number (focal length/iris diameter)=1, number of elements 128, and a central frequency 7.5 MHz. The left portion shows the contours of the sensitivity distribution, while the right portion shows the sensitivity along its central axis in dB. Under the conditions mentioned above, the range of −6 dB is 3 mm in depth direction.

Figure 8:
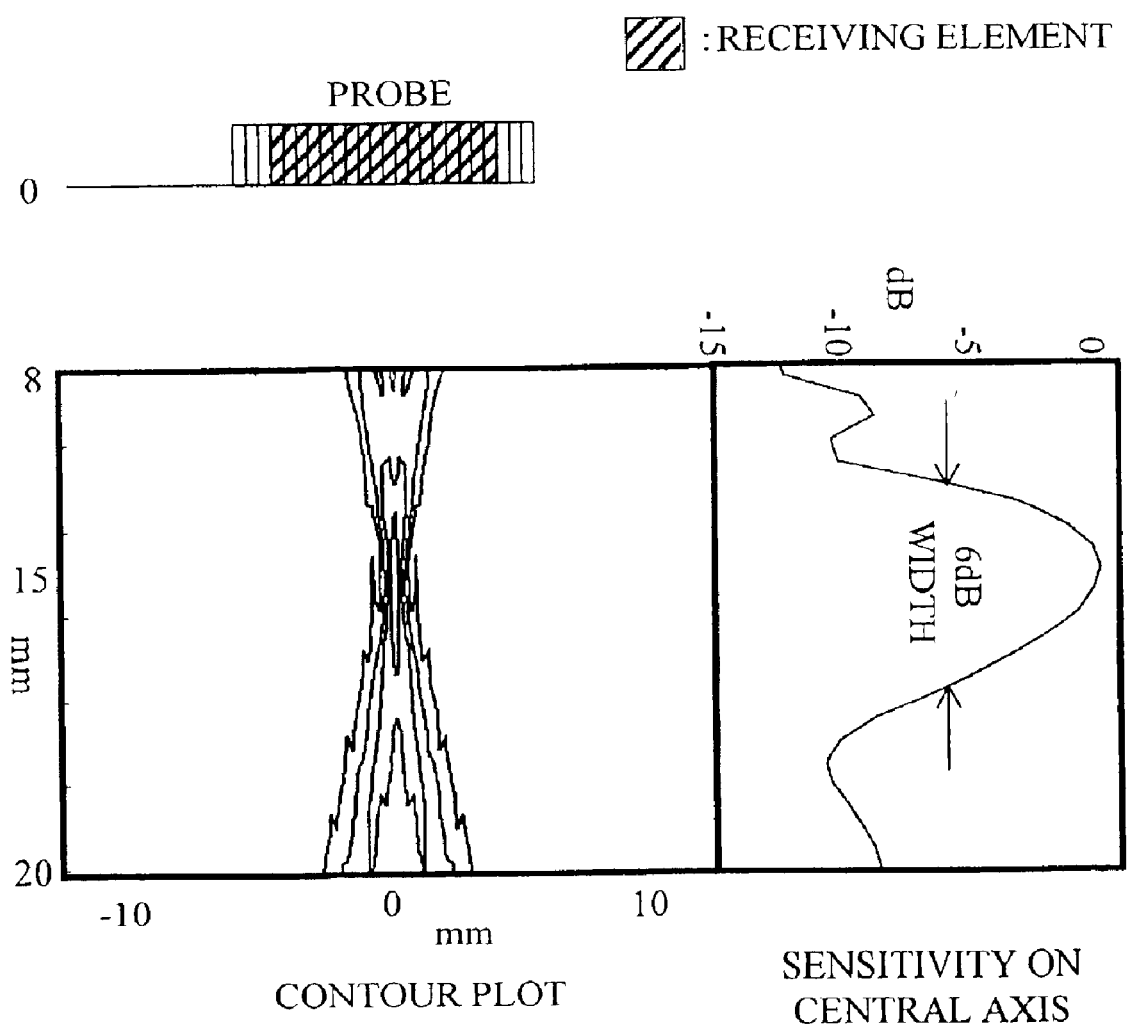
FIG. 8 shows the results of simulation illustrating the sensitivity distribution in the case of reception only using central 88 elements.
Figure 9:
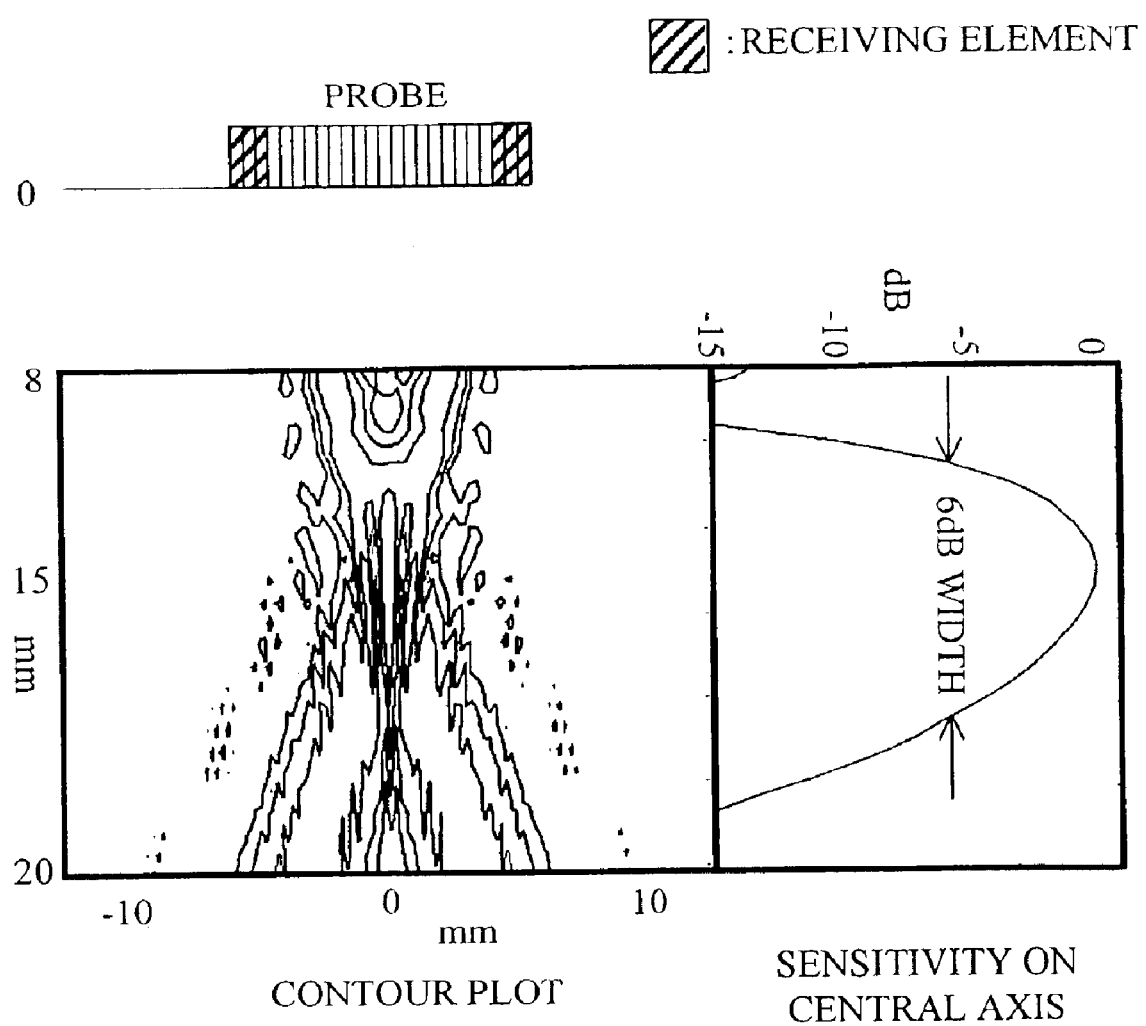
FIG. 9 shows the results of simulation illustrating the sensitivity distribution in the case of reception using 20 elements at either end.

FIG. 8 shows the result of beamforming exclusively by the central 88 elements. FIG. 9 shows the result of beamforming by 20 elements from either end, for a total of 40 elements. The range of −6 dB was 5 mm for FIG. 8 and 6 mm for FIG. 9. These focal ranges are about twice as large as the case of beamforming for all the elements at once. The elements were divided into the 20 elements at either end and the 88 elements at the center in order to make the individual focal ranges about the same length. The elements at the ends of the aperture contribute to narrow the beam in the depth direction, while the elements at the center contribute to narrow the beam width. Because the object here is to make the narrowing in the depth direction more gradual, the number of elements must be reduced increasingly towards the ends if the individual focal ranges are to be made about equal in length.

Table 1 shows the relationship between the number of the receive sub-beam formers and the length of the focal range. It will be seen that the focal range expands as the number of division increases.

TABLE 1

| Number of divided apertures | 1 | 2 | 5 | 8 |
|---|---|---|---|---|
| Length of −6 dB focal range | 3 | 5.3 | 14.8 | 34.9 |

Because the focal range is enlarged, the code length that can be used in a range which does not result in unwanted responses can be expanded. Since the rate of improvement of S/N ratio is substantially proportional to the square root of the code length, the enlargement of the focal range leads to an improved S/N ratio. If the purpose was only to enlarge the focal range, the aperture can be reduced in size. But in the present invention, the divided apertures are eventually bundled back together, so that the spatial resolution is not adversely affected at all. This second beamforming process is performed by the second receive beam former 38 shown in FIG. 3. As the second receive beam former 38 also performs dynamic focusing, this cannot take the place of the decoder 37.

While in the description with reference to FIGS. 8 and 9, the elements of the ultrasonic probe were bundled symmetrically between left and right, the division into sub-beam formers may be carried out by bundling elements with close delay times, or by bundling elements with close positions. For example, the receive signals may be divided into three sub-beam formers comprising 20 elements on the right, 88 elements at the center, and 20 elements on the left. The number of divided sub-beam formers may be selected depending on the desired code length, as long as the division method can realize a longer focal range than the code length transmitted during coded transmission/reception. For example, the number of divisions may be two on the coarser end, and every four or eight adjacent elements may be bundled on the finer end. These numbers may be fixed, or they may be varied by the control system in response to user selection. The efficiency of division can be increased by making the focal range of each sub-beam former equal to one another as much as possible. The length of the focal range is generally determined by using the width (−6 dB width) on the central axis of the aperture 6 dB below the peak. However, the decision position is not limited to −6 dB position and may vary in a range corresponding to the particular protocol. For example, instead of changing the magnitude of decibel, the distance between two minima on each side of a peak, or a value obtained by integrating the sensitivity with respect to the distance from the probe position, may be used.

Figure 12:
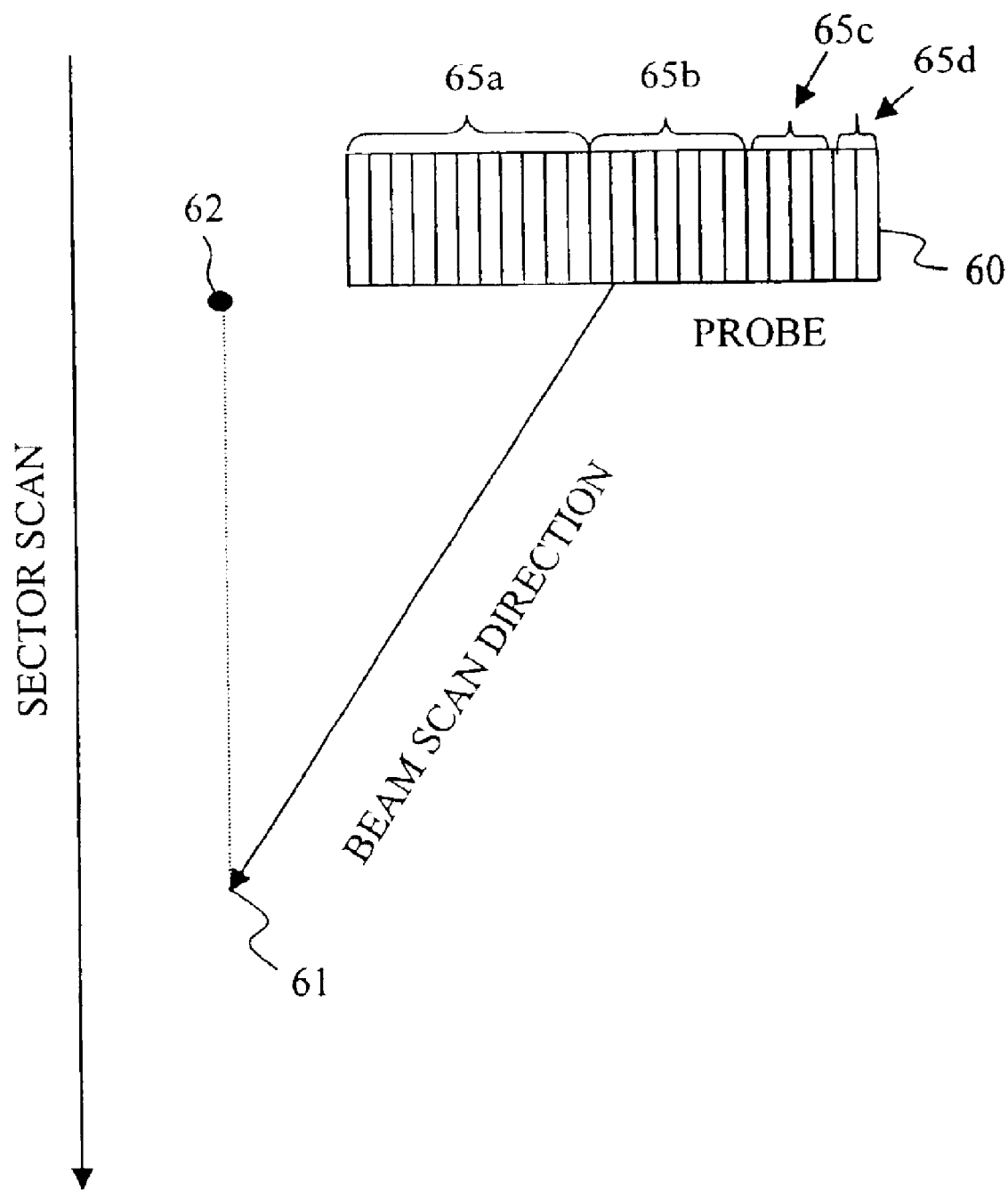
FIG. 12 illustrates the way in which the aperture of the ultrasonic probe is divided into sub-apertures.

The switching by the receive sub-aperture selection switch is performed in accordance with the beam scan as in the case of a linear probe and a convex probe. When the apertures are transported in parallel, the position and size of a sub-aperture relative to the apertures as a whole may be fixed. In the case of a sector probe, however, it is necessary to adapt the method of dividing into the sub-apertures to the beam scan, because the beam transmit direction is varied. The sub-aperture dividing method is similar to the one used in the above-described case where the beam direction is perpendicular to the probe surface, assuming that the position of the foot of a line extending from the transmit focal point 61 normal to the surface of the ultrasonic probe 60 is the center 62 of a virtual transmit aperture, as shown in FIG. 12. Sub-apertures 65a, 65b, 65c and 65d are preferably designed such that the nearer a sub-aperture is to the center 62 of the virtual transmit aperture, the more elements it contains.

Figure 10:
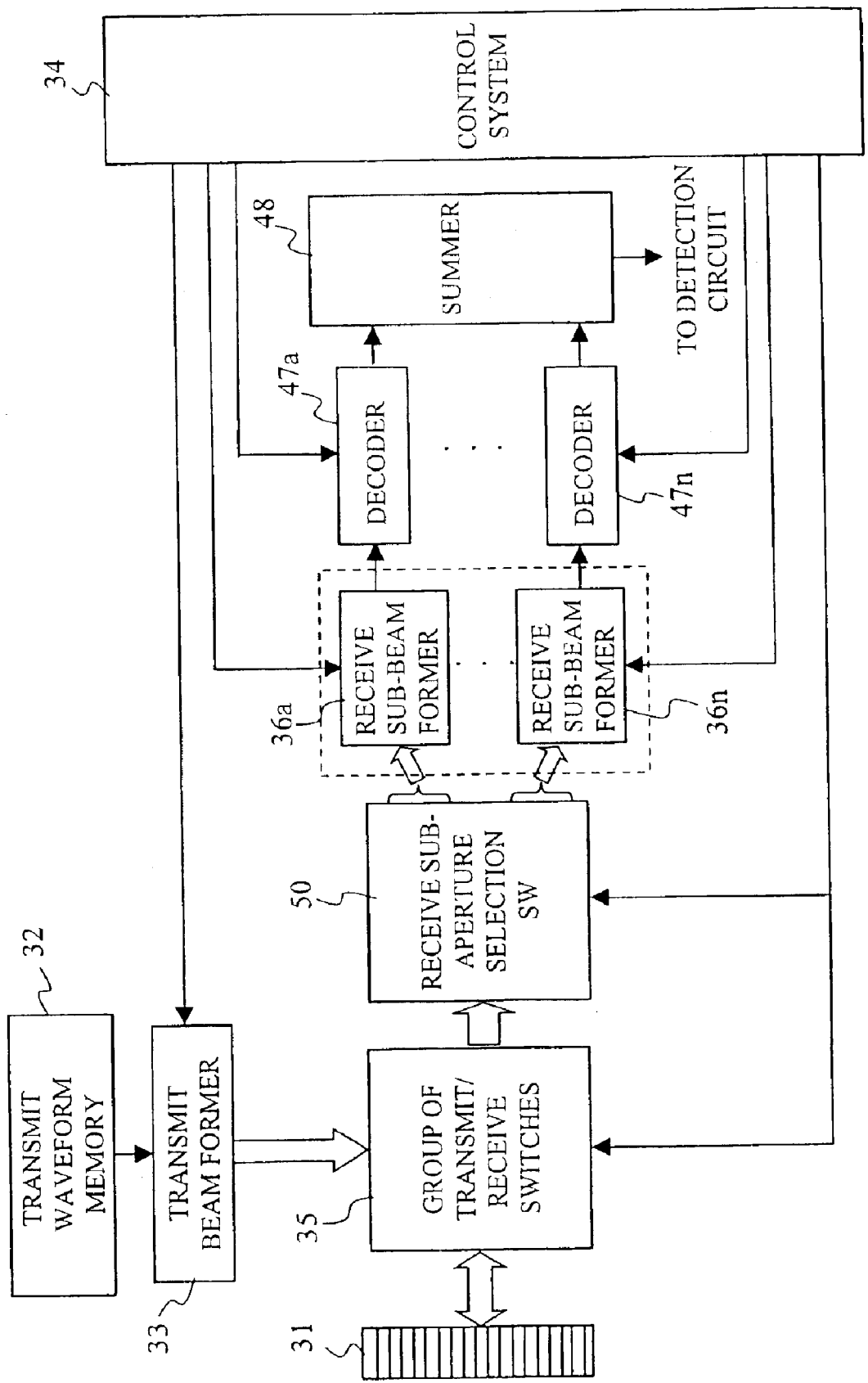
FIG. 10 shows a block diagram of another example of the ultrasonic imaging apparatus according to the present invention.

FIG. 10 shows a block diagram of another example of the ultrasonic imaging apparatus according to the present invention. In the example of FIG. 3, the decoders 37a to 37n did not change over time and the second receive beam former 38 varied dynamically. In the present example, however, the decoders 47a to 47n are varied over time while constituting the second receive beam former with an adder 48 that does not vary over time. In this case, the decoders 47a to 47n have different process contents for individual elements. By combining the decoders and the second beam formers, the same advantageous effects as those of the apparatus shown in FIG. 3 can be obtained.

Hereafter, an example where a two-dimensional oscillator array is used as the ultrasonic probe will be described. The circuit configuration is similar to that of FIG. 3. The two-dimensional oscillator array may be divided into receive sub-beam formers by bundling oscillators with either close delay times or close positions.

Figure 11A:
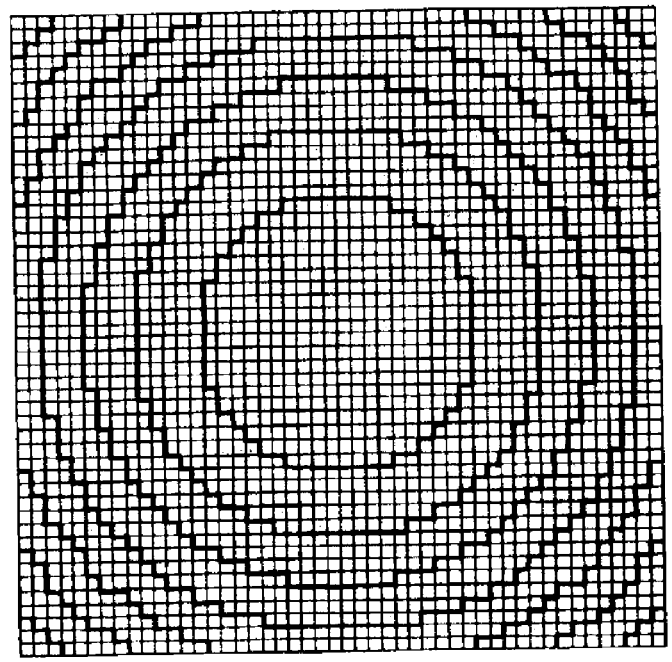
FIGS. 11A and 11B show different ways in which a two-dimensional array is structured.
Figure 11B:
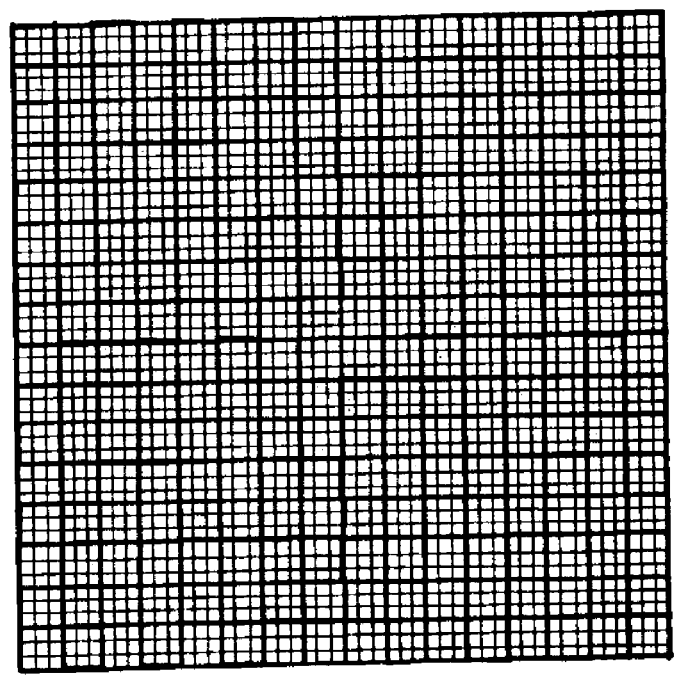

FIG. 11 shows the front view of the two-dimensional oscillator array, that is from the direction opposite the transmit direction, with the bundled oscillators indicated by bold lines. FIG. 11A shows the case where oscillators with close delay times are bundled in the same receive sub-beam former. FIG. 11B shows the case where oscillators with close element positions are bundled in the same receive sub-beam former. In general, it is advantageous in terms of phase alignment precision to bundle oscillators with close delay times. But in the case of multiple beams, it is more advantageous to bundle oscillators with close element positions, for that can provide a greater degree of freedom. Thus, particularly in the case of two-dimensional oscillator arrays, the manner of bundling the oscillator into sub-beam formers shown in FIG. 11B is also effective for high frame-rate purposes.

While the shape of the code has been described with reference to binary codes, the code shape is not particularly limited as long as the waveform is such that it can be expanded along the time axis, transmitted, and restored after reception. For example, waveforms such as the known chirp signals may be used.

Thus, in accordance with the present invention, an ultrasonic imaging apparatus is provided which combines the receive dynamic focusing and coded transmission/reception techniques without requiring a large-sized circuit configuration. Thus, the S/N ratio can be improved by coded transmission/reception and high-resolution images can be obtained by receive dynamic focusing, without producing unwanted responses.

While the preferred forms of the present invention have been described, it is to be understood that modifications will be apparent to those skilled in the art without departing from the spirit of the invention.

What is claimed is:

1. An ultrasonic imaging apparatus comprising:
    an ultrasonic probe having a plurality of oscillators and an aperture for transmitting and receiving an ultrasonic wave;
    a transmit signal processing circuit for producing a coded signal for driving the ultrasonic probe, the coded signal being expanded in a time axis direction;
    a receive sub-aperture selection switch for dividing receive signals from the individual oscillators of the ultrasonic probe into a plurality of groups;
    a plurality of first receive beam formers for phase-aligning and summing a plurality of receive signals outputted from a plurality of oscillators belonging to each of the groups;
    a decoding filter for compressing, in a time axis direction, a plurality of receive code-sequence signal waveforms outputted from the plurality of first receive beam formers; and
    a second beam former for summing the compressed signals while controlling delay time among the signals from said first receive beam formers.

2. An ultrasonic imaging apparatus according to claim 1, wherein the decoding filter comprises a plurality of decoding filters respectively connected to the plurality of receive beam formers, and a beam former between sub-apertures for beamforming the outputs of the plurality of decoding filters while controlling the distribution of the delay time.

3. An ultrasonic imaging apparatus according to claim 1, wherein the grouping by the receive sub-aperture selection switch is performed such that the depth of focal field of the ultrasonic waves by the plurality of first receive beam formers are substantially equal.

4. An ultrasonic imaging apparatus according to claim 1, wherein the receive sub-aperture selection switch comprises a plurality of switches for selecting to which of the plurality of first receive beam formers each of the oscillators of the ultrasonic probe is to be connected, and a control means for controlling the switch.

5. An ultrasonic imaging apparatus according to claim 1, wherein the plurality of oscillators of the ultrasonic probe are two-dimensionally disposed, and the receive sub-aperture selection switch divides the receive signals from the individual oscillators into a plurality of groups such that the difference in delay time in each first receive beam former becomes minimum.

6. An ultrasonic imaging apparatus according to claim 1, wherein the plurality of oscillators of the ultrasonic probe are two-dimensionally disposed, and the receive sub-aperture selection switch divides the receive signals from the individual oscillators into a plurality of groups such that oscillators spatially adjacent one another in the ultrasonic probe belong to the same group.

7. An ultrasonic imaging apparatus according to claim 1, wherein the number of oscillators which compose one receive sub-aperture is increasing as the position of sub-aperture is closer to the foot of a line extending from the position of transmit focal point normal to the surface of the ultrasonic probe.

8. An ultrasonic imaging method comprising the steps of:
    transmitting a beam of ultrasonic waves coded by a code sequence emitted by an ultrasonic probe having a plurality of oscillators and an aperture for transmitting and receiving an ultrasonic wave;
    producing a plurality of phase-aligned and summed signals by dividing the plurality of oscillators of the ultrasonic probe into a plurality of groups and phase-aligning and summing a plurality of receive signals outputted by a plurality of oscillators belonging to each of the groups; and
    compressing the plurality of phase-aligned and summed signals in a time axis direction; and
    summing the compressed signals while controlling the delay time among the signals.

9. The ultrasonic imaging method according to claim 8, wherein the plurality of oscillators of the ultrasonic probe are grouped such that the difference in delay time during the phase aligning and summing process is minimized.

* * * * *